(12) United States Patent
Barnes

(10) Patent No.: US 11,080,058 B2
(45) Date of Patent: Aug. 3, 2021

(54) APPARATUS AND METHOD FOR CONTROLLING A CHANGE IN INSTRUCTION SET

(71) Applicant: ARM LIMITED, Cambridge (GB)

(72) Inventor: Graeme Peter Barnes, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/619,192

(22) PCT Filed: Apr. 27, 2018

(86) PCT No.: PCT/GB2018/051116
§ 371 (c)(1),
(2) Date: Dec. 4, 2019

(87) PCT Pub. No.: WO2018/229455
PCT Pub. Date: Dec. 20, 2018

(65) Prior Publication Data
US 2020/0117458 A1    Apr. 16, 2020

(30) Foreign Application Priority Data

Jun. 15, 2017 (GB) .................................. 1709511

(51) Int. Cl.
*G06F 9/30* (2018.01)
*G06F 9/38* (2018.01)
*G06F 21/71* (2013.01)

(52) U.S. Cl.
CPC ...... *G06F 9/30181* (2013.01); *G06F 9/30054* (2013.01); *G06F 9/30076* (2013.01); (Continued)

(58) Field of Classification Search
None
See application file for complete search history.

(56) References Cited

U.S. PATENT DOCUMENTS 5,758,115 A      5/1998  Nevill
6,021,265 A  *   2/2000  Nevill ................. G06F 9/30181
                                                         712/209
(Continued)

FOREIGN PATENT DOCUMENTS

CN    103455733 B  *  3/2018  ......... G06F 9/30189
GB    2 448 149          10/2008
(Continued)

OTHER PUBLICATIONS

'MSMPX: Microarchitectural Extensions for Meltdown Safe Memory Protection' by Gnanambikai Krishnakumar et al., copyright 2019, IEEE. (Year: 2019).*
(Continued)

*Primary Examiner* — Steven G Snyder
(74) *Attorney, Agent, or Firm* — Nixon & Vanderhye P.C.

(57) ABSTRACT

An apparatus and method are provided for controlling a change in instruction set. The apparatus has processing circuitry arranged to operate in a capability domain comprising capabilities used to constrain operations performed by the processing circuitry. A program counter capability storage element is used to store a program counter capability used by the processing circuitry to determined a program counter value. The processing circuitry is arranged to employ a capability based operation to change the instruction set. In response to execution of at least one type of instruction to load an identified capability into the program counter capability storage element, the processing circuitry is arranged to invoke the capability based operation in order to perform a capability check operation in respect of the identified capability, and to cause the instruction set to be identified by an instruction set identifier field from the identified capability provided the capability check operation is passed.

20 Claims, 11 Drawing Sheets

(52) U.S. Cl.
CPC ...... *G06F 9/30101* (2013.01); *G06F 9/30189* (2013.01); *G06F 9/3861* (2013.01); *G06F 9/3865* (2013.01); *G06F 21/71* (2013.01)

(56) References Cited

U.S. PATENT DOCUMENTS

| | | | | |
|---|---|---|---|---|
| 7,340,588 | B2* | 3/2008 | Altman | G06F 9/30149 |
| | | | | 711/123 |
| 7,865,699 | B2* | 1/2011 | Altman | G06F 9/30181 |
| | | | | 712/210 |
| 9,063,723 | B2* | 6/2015 | Du | G06F 8/53 |
| 10,613,865 | B2* | 4/2020 | Barnes | G06F 9/3857 |
| 10,635,445 | B2* | 4/2020 | Teyssier | G06F 9/3861 |
| 2002/0199087 | A1 | 12/2002 | Seal et al. | |
| 2005/0114629 | A1* | 5/2005 | Altman | G06F 9/30185 |
| | | | | 712/209 |
| 2008/0065861 | A1* | 3/2008 | Altman | G06F 9/30185 |
| | | | | 712/210 |
| 2008/0168258 | A1 | 7/2008 | Armstrong et al. | |
| 2008/0250217 | A1 | 10/2008 | Kershaw et al. | |
| 2012/0042154 | A1 | 2/2012 | Grisenthwaite | |
| 2013/0262843 | A1* | 10/2013 | Du | G06F 9/30145 |
| | | | | 712/227 |
| 2018/0225120 | A1* | 8/2018 | Barnes | G06F 9/30054 |
| 2019/0370001 | A1* | 12/2019 | Teyssier | G06F 9/321 |
| 2020/0050454 | A1* | 2/2020 | Barnes | G06F 9/30054 |
| 2020/0142700 | A1* | 5/2020 | Barnes | G06F 12/1458 |

FOREIGN PATENT DOCUMENTS

| | | | | |
|---|---|---|---|---|
| GB | 2482701 | | 2/2012 | |
| GB | 2562102 | A * | 11/2018 | ........... G06F 9/3861 |
| GB | 2563010 | A * | 12/2018 | ........... G06F 9/3013 |
| GB | 2563580 | A * | 12/2018 | ........... G06F 9/3861 |
| JP | 08194504 | A * | 7/1996 | |
| JP | 2004013556 | A * | 1/2004 | ......... G06F 11/3624 |
| JP | 2013250980 | A * | 12/2013 | ........ G06F 9/30189 |
| WO | 2017/032969 | | 3/2017 | |
| WO | WO-2017032969 | A1 * | 3/2017 | ............... G06F 9/34 |
| WO | 2017/081438 | | 5/2017 | |
| WO | WO-2017081438 | A1 * | 5/2017 | ......... G06F 9/30192 |

OTHER PUBLICATIONS

'Everything You Want to Know About Pointer-Based Checking' by Santosh Nagarakatte, SNAPL 2015. (Year: 2015).*
Combined Search and Examination Report for GB Application No. 1709511.8 dated Nov. 21, 2017, 6 pages.
International Search Report and Written Opinion of the ISA for PCT/GB2018/051116 dated Jul. 11, 2018, 16 pages.

* cited by examiner

APPARATUS AND METHOD FOR CONTROLLING A CHANGE IN INSTRUCTION SET

This application is the U.S. national phase of International Application No. PCT/GB2018/051116 filed Apr. 27, 2018 which designated the U.S. and claims priority to GB Patent Application No. 1709511.8 filed Jun. 15, 2017, the entire contents of each of which are hereby incorporated by reference.

The present technique relates to the field of data processing.

There is increasing interest in capability-based architectures in which certain capabilities are defined for a given process, and an error can be triggered if there is an attempt to carry out operations outside the defined capabilities. The capabilities can take a variety of forms, but one type of capability is a bounded pointer (which may also be referred to as a "fat pointer").

When processing circuitry of an apparatus is arranged to execute a sequence of instructions, the capabilities can be used to constrain operations performed by the processing circuitry when executing those instructions. For example, by such an approach, it is possible to effectively police memory accesses made by the processing circuitry, by ensuring that the memory accesses are constrained having regard to range and permission information associated with certain capabilities. Such an approach can be used to constrain not only the data accessed in memory, but also the address range from which instructions can be retrieved for execution.

Some processors may be able to execute instructions from different instruction sets, and accordingly control information can be maintained to identify the current instruction set, with that control information being changed when it is decided to switch operation to execution of a different instruction set.

However, within a capability-based architecture, the ability to change instruction set can potentially undermine some of the security benefits achievable through the use of capabilities. In particular, changing instruction set changes the interpretation of instruction data fetched from memory, and hence can change the interpretation of read only code held in memory. It would be desirable to mitigate against the possibility of inadvertent or malicious attempts to change instruction set within a capability-based system.

In a first example configuration, there is provided an apparatus comprising: processing circuitry to execute instructions of an instruction set, the processing circuitry being arranged to operate in a capability domain comprising capabilities used to constrain operations performed by the processing circuitry when executing said instructions; and a program counter capability storage element to store a program counter capability used by the processing circuitry to determine a program counter value; the processing circuitry being arranged to employ a capability based mechanism to change the instruction set, in response to execution of at least one type of instruction that is used to load an identified capability into the program counter capability storage element, the processing circuitry being arranged to invoke the capability based mechanism in order to perform a capability check operation in respect of the identified capability and to cause the instruction set to be identified by an instruction set identifier field from the identified capability provided the capability check operation is passed.

In another example configuration, there is provided a method of controlling a change in instruction set within an apparatus having processing circuitry to execute instructions of a current instruction set, the processing circuitry being arranged to operate in a capability domain comprising capabilities used to constrain operations performed by the processing circuitry when executing said instructions, the method comprising: storing, within a program counter capability storage element, a program counter capability used by the processing circuitry to determine a program counter value; arranging the processing circuitry to be responsive to execution of at least one type of instruction that is used to load an identified capability into the program counter capability storage element, to invoke a capability based mechanism to control change of the current instruction set, said capability based mechanism comprising: performing a capability check operation in respect of the identified capability; and causing the instruction set to be identified by an instruction set identifier field from the identified capability provided the capability check operation is passed.

In a further example configuration, there is provided an apparatus comprising: processing means for executing instructions of an instruction set, the processing means for operating in a capability domain comprising capabilities used to constrain operations performed by the processing means when executing said instructions; and a program counter capability storage element means for storing a program counter capability used by the processing means to determine a program counter value; the processing means employing a capability based mechanism to change the instruction set, in response to execution of at least one type of instruction that is used to load an identified capability into the program counter capability storage element, the processing means for invoking the capability based mechanism in order to perform a capability check operation in respect of the identified capability and to cause the instruction set to be identified by an instruction set identifier field from the identified capability provided the capability check operation is passed.

In a yet further example configuration, there is provided a virtual machine computer program comprising program instructions to control a host data processing apparatus to provide an instruction execution environment corresponding to the apparatus of the first example configuration discussed above. In one embodiment a computer-readable storage medium may be provided for storing the virtual machine computer program.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
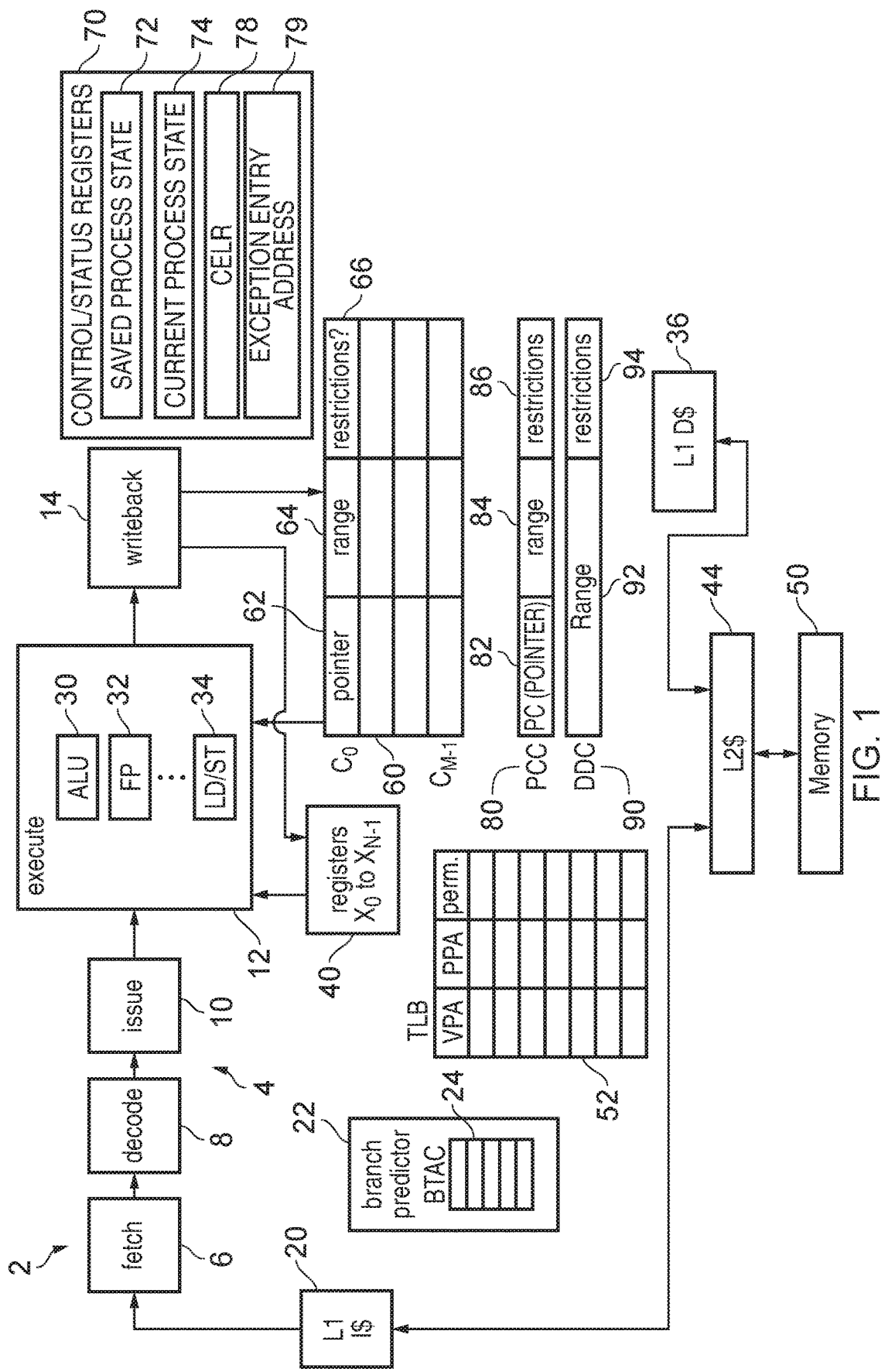
FIG. 1 is a block diagram of an apparatus in accordance with one embodiment.

Before discussing the embodiments with reference to the accompanying figures, the following description of embodiments is provided.

As mentioned earlier, there is an increasing interest in capability-based architectures in which certain capabilities are defined for a given process, and an error can be triggered if there is an attempt to carry out operations outside the defined capabilities. Various types of capabilities may be defined, but one type of capability is a bounded pointer (which in one embodiment incorporates both a pointer value and associated range and permissions information).

An apparatus adopting such a capability-based architecture will typically have storage elements (also referred to herein as bounded pointer storage elements, or more generally capability storage elements) that are used to store the capabilities. The storage elements can be registers (also referred to herein as bounded pointer registers or capability registers) and/or can be memory locations in general purpose memory, for example a location on a stack memory. Certain instructions can be used to reference such storage elements in order to access a desired capability, and perform operations dependent on that capability. For example, considering a bounded pointer, execution of such an instruction can cause the bounded pointer to be retrieved, and for the pointer value therein to then be used to derive an address in memory required during execution of the instruction. The pointer value may be used directly to identify the memory address, or may be used to derive the memory address, for example by the addition of an offset to the pointer value. The operation will then be allowed to proceed provided that the memory address is within the range specified by the range information, and any permissions specified in the permissions information are met.

Hence, when using bounded pointers, the pointer value itself may point to, or be used to determine, the address of a data value to be accessed or an instruction to be fetched for execution, for example. However the range and permission information may then be referred to, for example, to ensure that any address accessed is within an allowable range, and being accessed for an allowed purpose. This can be useful for example for ensuring that the address determined from the pointer remains within certain bounds to maintain security or functional correctness of behaviour. By such an approach, it is possible to effectively police memory accesses made by the processing circuitry.

However, in systems that support use of multiple instruction sets, then the ability to change instruction set could potentially circumvent some of the protection afforded through the use of capabilities. In particular, the interpretation of instruction data fetched from memory will be different once the indication of the instruction set has been changed. Hence, whilst the capability-based architecture may limit the range of addresses from which instructions may be fetched, an inadvertent or malicious attempt to change the instruction set may cause the processing circuitry to legitimately fetch an instruction of a first instruction set as allowed by the constraints of the capability-based architecture, but for the processing circuitry to then seek to interpret that fetched instruction in accordance with a second instruction set, potentially bringing about undesirable operational behaviour of the processor.

The embodiments described herein seek to provide a controlled mechanism for changing instruction set, to seek to reduce the ability of inadvertent or malicious attempts to change the instruction set.

In one embodiment, an apparatus has processing circuitry for executing instructions of an instruction set, the processing circuitry being arranged to operate in a capability domain comprising capabilities used to constrain operations performed by the processing circuitry when executing the instructions. The capability domain comprises a set of capabilities formed by the capabilities currently residing in capability storage elements accessible to the processing circuitry, and any further capabilities accessible via the capabilities held in those capability storage elements. One of the capability storage elements is a program counter capability storage element that is used to store a program counter capability used by the processing circuitry to determine a program counter value. The program counter value is then used to identify an address in memory from which to fetch instructions.

In the described embodiments, the processing circuitry can be arranged to employ a capability based mechanism to change the instruction set. In particular, in response to execution of at least one type of instruction that is used to load an identified capability into the program counter capability storage element, the processing circuitry is arranged to invoke the capability based mechanism in order to perform a capability check operation in respect of the identified capability. As a result of performing the capability check operation, this causes the instruction set to be identified by an instruction set identifier field from the identified capability, provided the capability check operation is passed.

As a result of employing this capability based mechanism, when the processing circuitry seeks to update the program counter capability by executing an instruction to load an identified capability into the program counter capability storage element, it is necessary for the capability check operation to be passed before an instruction set identifier field within the identified capability is allowed to identify the instruction set. When the capability check operation is passed, this mechanism hence allows the instruction set to be changed, but if the capability check operation is failed this update in instruction set will be prevented, and instead an alternative action will be taken, for example by taking an exception.

The timing of the capability check operation can be varied dependent on embodiment. For example, in one embodiment the processing circuitry may be arranged to perform the capability check operation on the identified capability prior to loading that identified capability into the program counter capability storage element. As a result of such an approach, it is known whether the capability check operation is passed or failed before it is decided whether to allow the identified capability to be loaded into the program counter capability storage element.

However, in an alternative embodiment the processing circuitry may be arranged to perform the capability check operation on the identified capability after loading that identified capability into the program counter capability storage element. This can avoid any delay in execution of the instruction that loads the identified capability into the program counter capability storage element, whilst still ensuring that that updated program counter capability is not relied upon before the capability check operation is performed. For example, as soon as the next instruction is to execute, this can trigger performance of the capability check operation, hence avoiding any details of that updated program counter capability being used before it is determined whether the capability check operation is passed, and hence in particular avoiding interpreting any fetched instruction in accordance with a changed instruction set as might be indicated by the instruction set identifier field from the identified capability, unless the capability check operation is determined to have been passed.

There are a number of actions that the processing circuitry could be arranged to take when detecting failure of the capability check operation, but in one embodiment the processing circuitry is arranged to take an exception. In one embodiment, this may for example cause a software exception handler to record certain information relating to the failure of the capability check operation, and to then transfer control to an appropriate error handling routine to deal with the attempted change in instruction set. Whilst the error handling routine may take a variety of steps, in one embodiment it may choose to terminate the application that sought to invoke the change in instruction set, since as mentioned earlier in one embodiment it is highly desirable to tightly control the ability to change instruction set, so as to mitigate against the possibility of a change in instruction set being used to seek to circumvent the protection afforded by the use of capabilities.

Whilst in one embodiment an exception may be taken immediately in response to detecting failure of the capability check operation, in an alternative embodiment a flag may be set to identify failure of the capability check operation, with the setting of the flag causing the exception to be taken when a next instruction is to be executed. This allows certain events to happen in between the time the failure condition is detected and the flag is set, and the time the exception is taken. For example, it can allow a higher priority exception/interrupt to be taken that preserves the flag information and the program counter capability (PCC) information, and then clears the flag and loads a different program counter capability into the program counter capability storage element. On return from that higher priority exception/interrupt, the flag and PCC information will then be restored, and when the next instruction is to be executed the presence of the set flag will cause the exception to be taken.

The at least one type of instruction that is used to load an identified capability into the program counter capability storage element can take a variety of forms, but in one embodiment the instruction is a branch instruction, such that the processing circuitry is arranged to invoke the capability based mechanism by executing a branch instruction specifying the identified capability.

The branch instruction can take a variety of forms. For instance, it may be a branch instruction that explicitly identifies via a source operand the identified capability. For example, the apparatus will typically comprise one or more capability storage elements that are accessible to the processing circuitry, and that are arranged to store capabilities used to constrain operations performed by the processing circuitry when executing the instructions. The branch instruction may then specify one of those capability storage elements as a source operand, with the specified capability storage element then containing the identified capability.

In other examples, the branch instruction may implicitly identify the identified capability. For example, the branch instruction may take the form of a return instruction which is executed in order to load into the program counter capability storage element a return address capability forming the identified capability. Typically, the return instruction does not need to explicitly identify the return address capability, since there will be a default storage element containing the return address capability, in one example this being referred to as the capability exception link register (CELR).

The capability check operation can take a variety of forms, and hence by way of example a variety of different fields within the identified capability may be referred to during performance of the capability check operation in order to decide whether the capability check operation is passed or failed. For example, in one embodiment the processing circuitry may be arranged, when performing the capability check operation, to check a valid flag associated with the identified capability in order to prevent the capability check operation being passed unless the identified capability is a valid capability. Hence, whenever the processing circuitry seeks to update the program counter capability storage element contents using information that does not represent a valid capability, this will cause the capability check operation to fail.

Alternatively, or in addition, the capability check operation may be arranged to refer to one or more permission flags provided within the identified capability. In particular, the identified capability will typically comprise one or more permission flags used to identify the state of one or more permissions associated with the identified capability. For example, the permissions may be used to restrict the use of the capability to certain types of operation, certain modes of operation of the processing circuitry, etc. Different permissions may also be associated with different types of information being accessed, so that for example different write and read permissions may be set dependent on whether the information being accessed is itself a capability, or a normal data value.

Within such embodiments, the processing circuitry may be arranged, when performing the capability check operation, to check one or more permission flags in order to prevent the capability check operation being passed unless at least one permission is in a predetermined state.

By such an approach, it is possible to constrain the ability to change the instruction set to situations where the identified capability has at least one permission in a particular state. As one example, the at least one permission may comprise an executable permission used to identify whether the identified capability, when used as the program counter capability, is allowed to be used to fetch instructions from memory, and the predetermined state is a set state indicating that the identified capability is allowed to be used to fetch instructions from memory, subject to any overriding control information preventing use of the identified capability to fetch instructions from memory. In one embodiment, if the executable permission were in the clear state, this would identify that the capability, when forming a program counter capability, is prevented from being used to fetch instructions from the memory. Hence, this would identify that the capability was not suitable for being used as a program counter capability, and hence if an instruction is seeking to load that capability into the program counter capability storage element, the capability check operation may in one embodiment be failed, preventing the contents of the instruction set identifier field within that identified capability from being used to identify the instruction set.

As another example of how the permission flags may be checked, the at least permission may comprise a modifiable permission used to identify whether the identified capability is modifiable by one or more capability modifying instructions, and the predetermined state is a clear state indicating that the capability is unmodifiable by said one or more capability modifying instructions. When the identified capability is marked as being unmodifiable, this can provide additional reassurance that the content of the instruction set identifier field will not have been tampered with in the period of time between when the capability was established (for example by a process operating at a particular privileged level), and a process (which may not be at that privileged level) subsequently seeks to load that capability into the program counter capability.

There are a number of ways in which the contents of the instruction set identifier field from the identified capability can be used to identify the instruction set, in situations where the capability check operation is passed. In one embodiment, when the capability check operation is passed, the processing circuitry is arranged to cause the identified capability, including the instruction set identifier field, to be used to form a new program counter capability within the program counter capability storage element. Further, the value of the instruction set identifier field within the new program counter capability is used to determine the instruction set. Hence, in such embodiments the current instruction set is identified by the contents of an associated instruction set identifier field within the program counter capability.

However, in an alternative embodiment, when the capability check operation is passed, the processing circuitry is arranged to cause the identified capability to be used to form a new program counter capability within the program counter capability storage element but with a field in the new program counter capability corresponding to the instruction set identifier field being set to a default value. The processing circuitry further causes the value within the instruction set identifier field of the identified capability to be written into an instruction set control storage element, and the value within the instruction set control storage element is used to determine the instruction set. Hence, in such an embodiment, as the identified capability is loaded into the program counter capability storage element, the contents of the instruction set identifier field are extracted and written into an instruction set control storage element. Hence, in such embodiments, it is the contents of the instruction set control storage element that are used to determine the current instruction set.

The instruction set control storage element can take a variety of forms, but in one embodiment is provided by a field within a current processor state register (CPSR).

In one embodiment, the earlier described capability based mechanism for changing the instruction set may be the only mechanism provided to allow the instruction set to be changed. However, in an alternative embodiment the processing circuitry may further provide an exception based mechanism to change the instruction set, on invoking the exception based mechanism the processing circuitry being arranged to take an exception into a predefined state, where trusted software is then executed to establish return state that identifies the instruction set to be used on return from the exception. Hence, by such an approach, it is possible to use a trusted exception/exception return mechanism to trigger the use of trusted software to modify the instruction set.

Whilst one or more further controlled mechanisms may also be provided for changing instruction set, in one particular embodiment the processing circuitry may be constrained so as to only allow the instruction set to be changed by using either the capability based mechanism or the exception based mechanism. By tightly constraining the way in which the instruction set can be changed, this provides increased resilience to inadvertent or malicious attempts to seek to change the instruction set, which could potentially circumvent one or more of the security measures put in place through the use of capabilities.

Particular embodiments will now be described with reference to the Figures.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
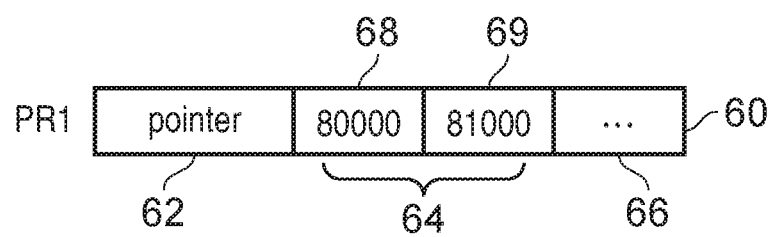
FIG. 2 shows examples of types of instruction for which an error may be triggered if there is an attempt to set or access a pointer value within a set of bounded pointer storage elements where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception levels of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Further, in one embodiment non-bounded pointers may also be specified within the general purpose registers 40 and used when performing memory accesses. To limit memory addresses that may be accessed using such non-bounded pointers, a Default Data Capability (DDC) register 90 may be provided that specifies both range information 92 and any restriction data 94, similar to the range and restriction information included within any of the capability registers. Then, when a memory access instruction is executed that identifies a memory address with reference to a non-bounded pointer in a general purpose register 40, a bound check operation similar to the bound check operation performed in respect of bounded pointers can still be performed based on any address derived from that non-bounded pointer, but in this instance having regards to the range and restriction information held within the DDC register 90. By such an approach, it is possible for example for capability aware code that wishes to utilise some capability unaware code in an existing software library to set the DDC register 90 so as to place constraints on how pointers accessed from the general purpose register 40 are used when executing that capability unaware code. In particular, the range information can be used to limit the address range that can be accessed when executing such capability unaware code.

Any particular range of memory addresses identified by a bounded pointer within a bounded pointer register may contain data, instructions and/or other capabilities (i.e. other bounded pointers). Hence, it will be appreciated that at any point in time the processing circuitry's ability to access memory is defined by a set of capabilities comprising the capabilities identified in the bounded pointer registers and any further capabilities accessible via the capabilities held in those bounded pointer registers, and this set of capabilities will be referred to herein as a capability domain.

The range information and any associated restrictions specified in the PCC register 80 or the DDC register 90 can be set in a variety of ways. However, in one embodiment that information is determined using one or more of the bounded pointers available to the processing circuitry in a current capability domain, so that no memory address can be accessed using PCC or DDC based bound checks that resides outside the memory address range(s) identified for the current capability domain.

Figure 3:
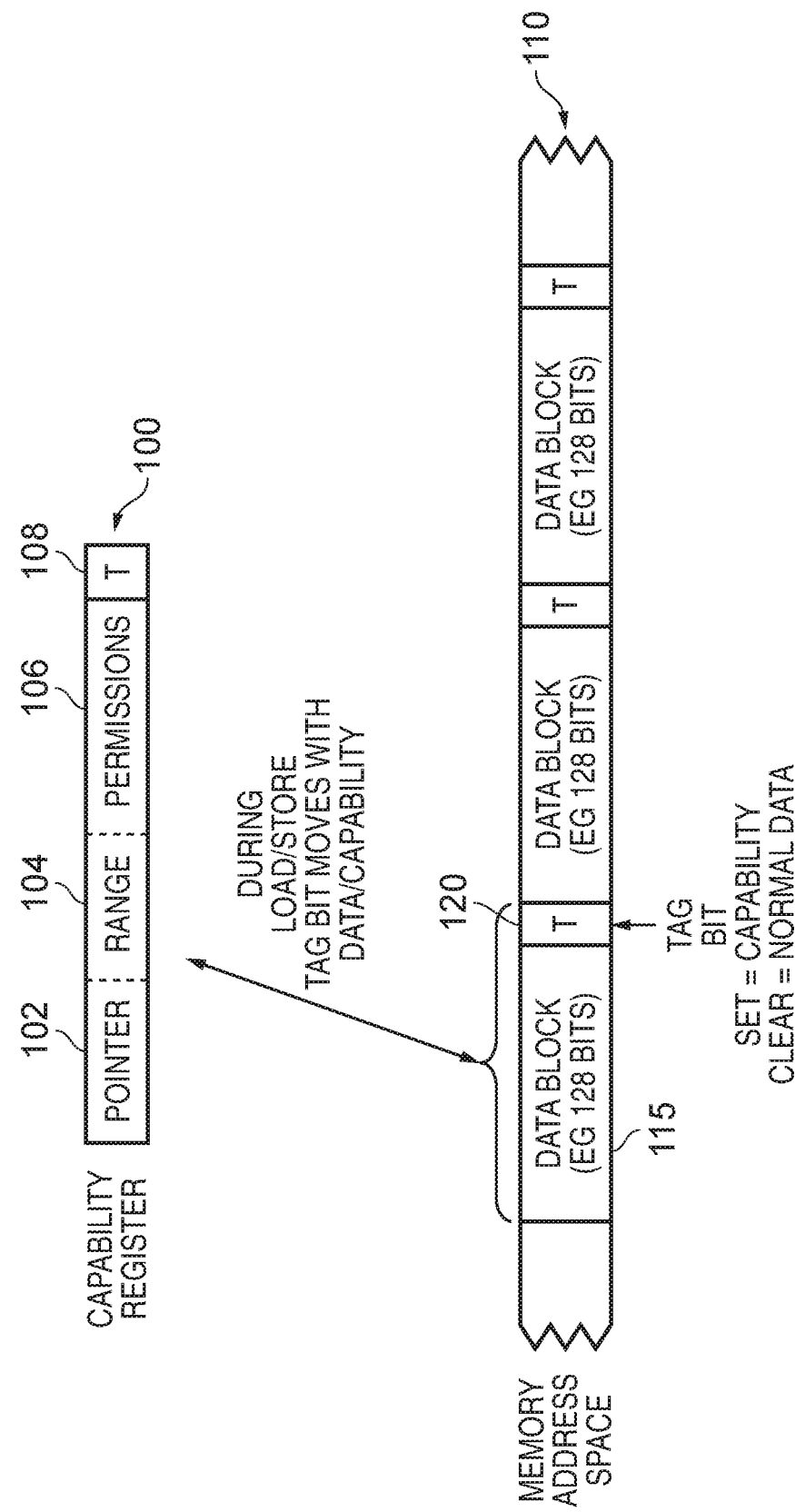
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

In one embodiment, the apparatus may be arranged so that it can operate at different exception levels, where each exception level has different software execution privilege. Further, an exception mechanism may be used to transition between the plurality of exception levels. However, in one embodiment not all exceptions will cause the exception level to change.

As shown in FIG. 1, the apparatus 10 has access to a variety of control/status registers 70 which store various control and status information referenced by the processing circuitry during its operation, the control/status registers 70 including a variety of registers that are used during the handling of exceptions.

As shown in FIG. 1, current process state 74 is maintained within the control/status registers 70, to capture a variety of execution state information relating to the processor's current operation. While shown as a single box 74, the current process state will not necessarily all be stored within a single register, but may be stored within a number of control and status registers within the available control/status registers 70.

During operation, an exception may be triggered by a variety of different mechanisms, for example an interrupt, a system call, a fault, etc. In accordance with one embodiment, when an exception is taken, an exception entry mechanism is triggered, and during this process the current process state 74 is captured as saved process state 72. Again, the saved process state 72 may be stored within a single register, or within multiple registers. An exception handling operation is then performed by the processing circuitry to process the exception. When the processing circuitry subsequently returns from the exception, the saved process state will be restored into the current process state, allowing the processing circuitry to continue the operations that it was performing prior to the exception being taken.

To enable execution state of the processing circuitry to be maintained for multiple exception levels, separate saved process state registers (SPSRs) 72 and current process state registers (CPSRs) 74 can be maintained for multiple of the exception levels if desired.

On exception entry, the program counter capability register 80 may be updated using exception entry address capability information stored in a capability control storage element 79. In particular, the register 79 will store information about the appropriate address to be used on exception entry, and also associated capability information to be provided in addition with that address to form a program counter capability to be stored within the PCC register 80. The exception entry address information in the register 79 can take a variety forms, but in one embodiment the register 79 takes the form of a capability vector base address register (CVBAR). This register provides a base address for exception entry, and the exception determines an offset from this base address in dependence on the exception type. Hence, information about the type of exception will be used to identify the appropriate address to be used to form the program counter capability loaded into the PCC register 80, with the remaining portion of the capability information for the PCC register being formed from the corresponding portion of the capability in the CVBAR.

As mentioned earlier, on taking an exception, the current process state 74 is captured as saved process state 72. In addition, the current program counter capability stored within the PCC register 80 is used to identify a preferred return address capability. The preferred return address will be dependent on the type of exception, but will typically be the program counter value, or the program counter value incremented by the instruction size (for example incremented by 4 assuming byte sized addressing, and 32-bit instructions). In addition to the preferred return address, the remaining capability information from the current program counter capability will also be copied into the return address capability generated from the PCC. In one embodiment, the return address capability generated in this manner will be stored within a dedicated return address capability register, in one particular embodiment this being the capability exception link register (CELR) 78. On later returning from an exception, the contents of the CELR register 78 can be restored into the PCC register 80, and in addition the contents of the SPSR register 72 can be restored into the CPSR register 74 for the relevant exception level.

The use of a capability-based system as described above can significantly enhance security and functional correctness of behaviour of the system. For example, through use of such an approach it is possible to effectively police memory accesses made by the processing circuitry, to control both the instructions fetched from memory for execution, and the data values manipulated by the processor when executing those instructions. However, as mentioned earlier, some systems allow for the execution of instructions from multiple instruction sets, with control state being maintained to identify the current instruction set being used, and hence identifying how the instruction data fetched from memory should be interpreted when decoding the instructions for execution. An inadvertent or malicious attempt to change the instruction set could circumvent some of the protection afforded by the use of capabilities, since it may enable a change in the interpretation of read only code held in memory. The embodiments described herein provide a mechanism for tightly controlling how the instruction set can be changed within such an apparatus, with the aim of alleviating such risks.

Figure 4:
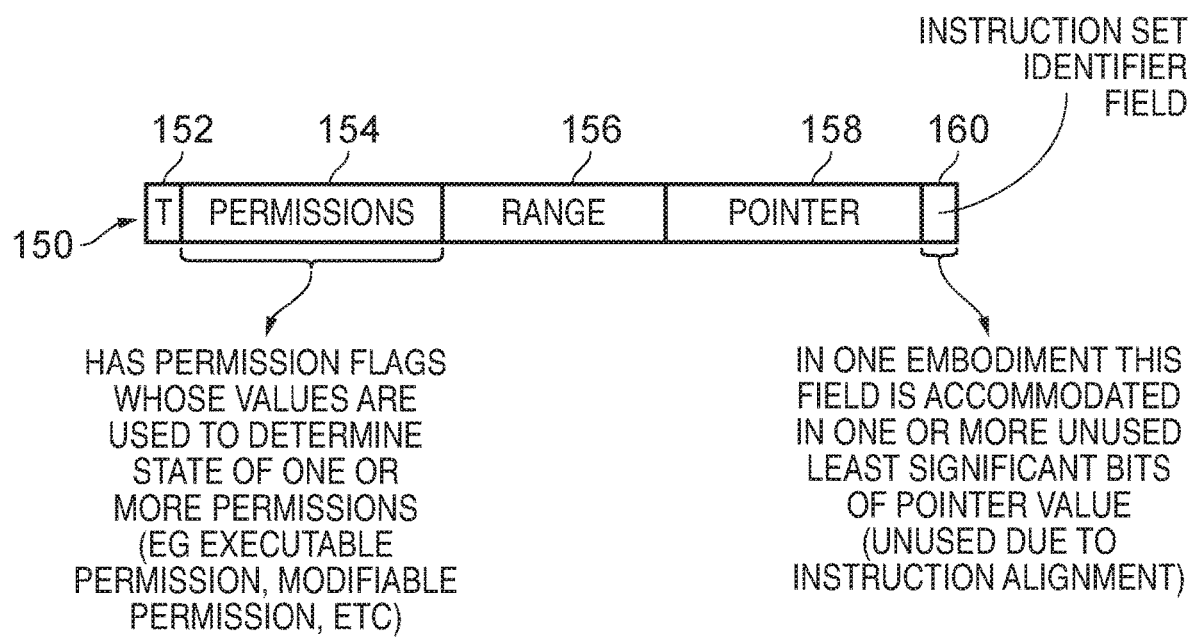
FIG. 4 schematically illustrates how an instruction set identifier field may be incorporated within a capability in accordance with one embodiment.

FIG. 4 illustrates how a capability may be supplemented with an additional field that serves as an instruction set identifier field. In particular, the capability 150 in this example is assumed to be a bounded pointer, hence having a pointer value 158, and associated range and permissions fields 156, 154, respectively. A tag bit 152 is also provided to indicate whether the associated information represents a valid capability or not. The permissions encoded within the permissions fields 154 can be determined by the state of a number of permission flags provided within those fields, such that the values of the permission flags are used to determine the state of one or more permissions. These permissions can take a variety of forms, but in one embodiment may include at least an executable permission identifying whether the associated capability, when used as the program counter capability, is allowed to be used to fetch instructions from memory, and a modifiable permission used to identify whether the associated capability is modifiable by one or more capability modifying instructions. In one embodiment, the permissions may need to be interpreted in combination with other control information that may affect the permissions. Hence, in one embodiment, if the permission is in a clear state this indicates that that permission is not granted in respect of the capability. However, if the permission is in the set state, then this will in one embodiment indicate that the permission is granted, subject to any overriding control information that may affect the granting of that permission.

As also shown in FIG. 4, a field 160 can be provided to identify an instruction set. The size of this field will depend on the number of instruction sets supported, but by way of example if there are merely two supported instruction sets, a single bit field will be sufficient to enable each of the two instruction sets to be identified.

Whilst the instruction set identifier field may be a separate dedicated field, in one embodiment it can be formed by one or more least significant bits of the pointer value field. For example, due to memory alignment constraints on the pointer value, it may be that one or more least significant bits of the pointer value are unused, and accordingly those unused bits can be used to provide the instruction set identifier field.

In one embodiment, the instruction set identifier field value has no relevance whilst the capability is a general purpose capability within one of the general purpose capability registers 60. However, when the capability is to be loaded into the PCC register 80 to form a new program counter capability, the instruction set identifier field information can be used in order to identify the instruction set that will be applicable once that capability is used as a new program counter capability. This hence provides a simple mechanism for enabling the instruction set to be altered.

However, in order to ensure that the use of such an instruction set identifier field to specify the instruction set is robust against misuse, then whenever an instruction is used to load an identified capability into the PCC register 80, a capability based mechanism is invoked in order to perform a capability check operation in respect of the identified capability, before allowing the instruction set to be changed using the instruction set identifier field information from the identified capability.

Figure 5:
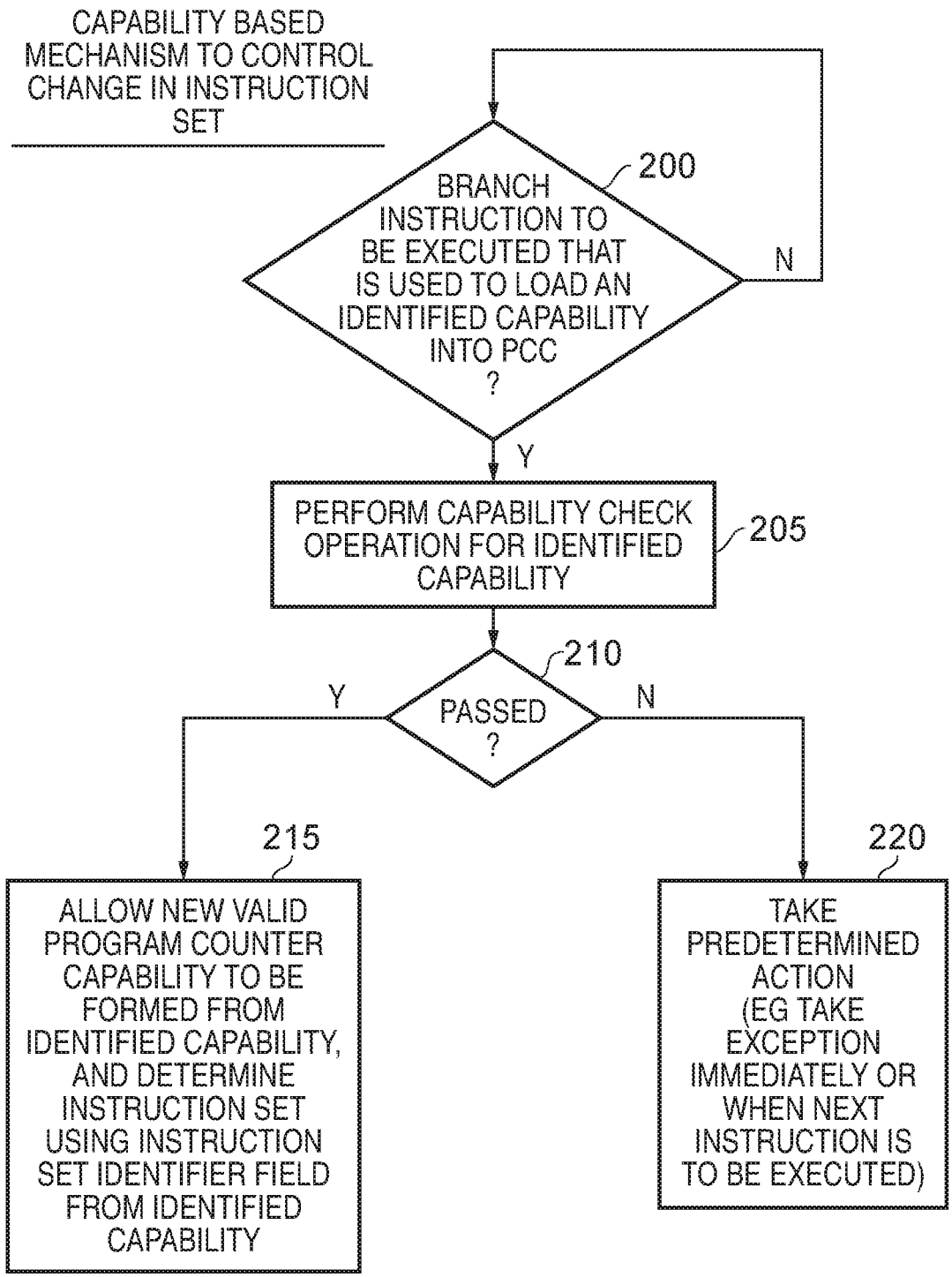
FIG. 5 is a flow diagram illustrating steps performed to implement a capability-based mechanism for controlling a change in instruction set, in accordance with one embodiment.

FIG. 5 is a flow diagram providing a general overview of the capability based mechanism used in one embodiment to control a change in instruction set. In one embodiment, the capability based mechanism is triggered when a certain type of instruction seeks to load an identified capability into the program counter capability register 80. In particular, the capability based mechanism may be triggered when a branch instruction is used for that purpose. Accordingly, at step 200 it is determined whether a branch instruction is to be executed by the processor, where that branch instruction specifies a capability. The branch instruction may specifically identify a source capability register within the set of capability registers 60, with that source capability register containing the identified capability that is to be loaded into the PCC register 80. However, other forms of branch instruction may also be detected at step 200. For example, a return instruction used to return back to some previous code following the earlier taking of an exception can also be considered to be a branch instruction of the type that should be detected at step 200, since again it will cause the PCC register 80 contents to be updated with an identified capability. In the example of a return instruction, the register containing the identified capability may not need to be explicitly identified, since it may be implicit from the return instruction. In particular, in one embodiment a return instruction will cause the contents of the CELR register 78 to be loaded into the PCC register 80.

Having identified that a branch instruction is to be executed that will be used to load an identified capability into the program counter capability register, the process proceeds to step 205, where a capability check operation is performed for the identified capability. As will be discussed later with reference to FIGS. 6 and 7, the timing of performance of the capability check operation can be varied dependent on embodiment. For example, it may be performed prior to updating the PCC register contents, or after those contents have been updated. However, in one embodiment, irrespective of which approach is taken, the capability check is performed so that no action will be taken in dependence on the updated program counter capability and associated instruction set identifier information, until the capability check has been performed, and has been determined to have been passed.

Following performance of the capability check operation at step 205, it is then determined at step 210 whether the check operation has been passed or not. If so, the process proceeds to step 215, where a new valid program counter capability is allowed to be formed from the identified capability, and further the instruction set is determined using the instruction set identifier field from the identified capability. As will be discussed in more detail later with reference to FIGS. 9A and 9B, the contents of the instruction set identifier field can be copied across into the program counter capability, or instead can be extracted and stored within a separate control register.

If at step 210 it is determined that the capability check has not been passed, then the process proceeds to step 220 where a predetermined action is taken. The predetermined action can take a variety of forms, but in one embodiment may involve the taking of an exception directly upon determining that the capability check operation has been failed. Alternatively, the taking of the exception may be deferred, and instead may be triggered by the next instruction being executed in due course.

Figure 6:
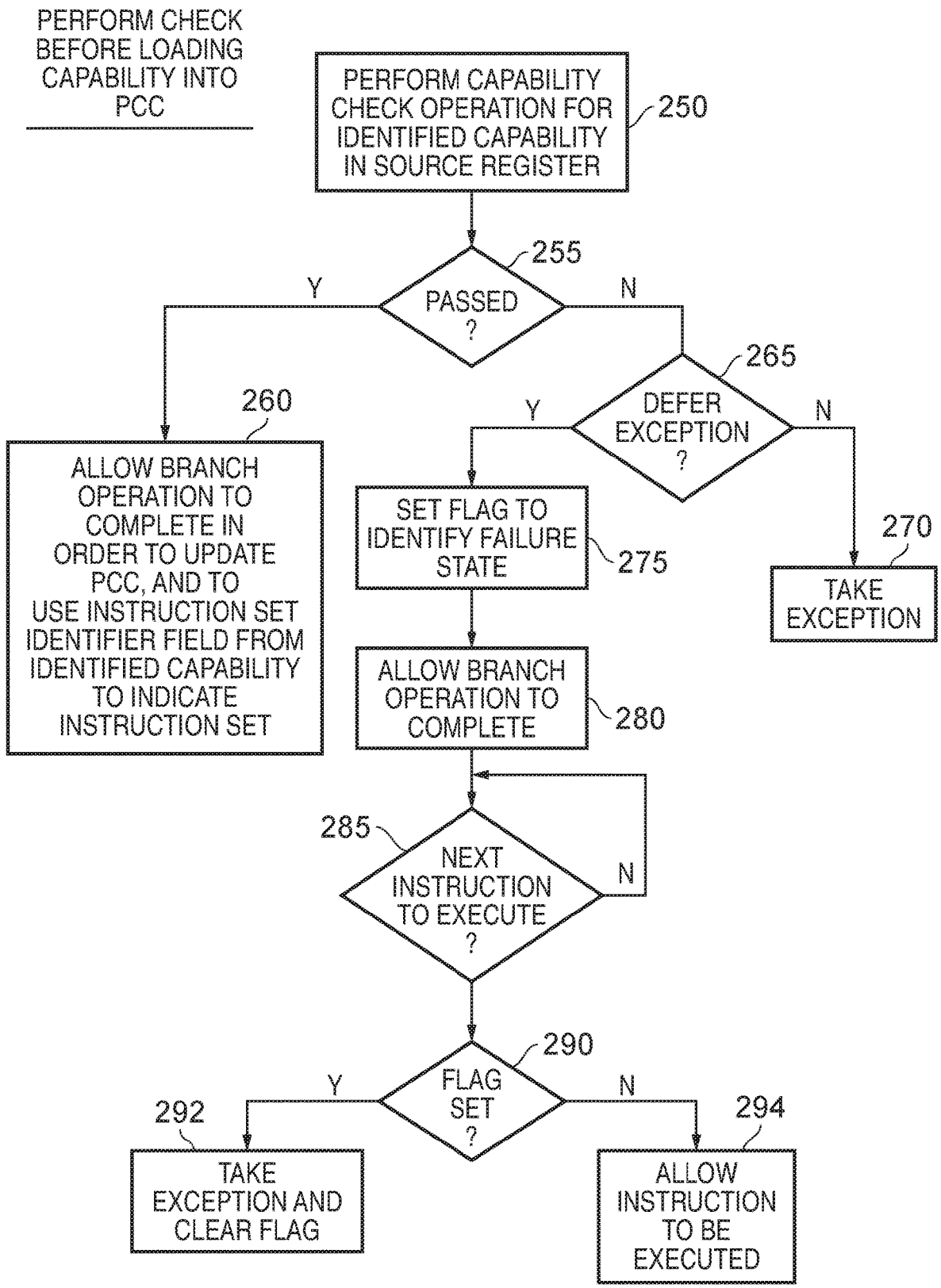
FIG. 6 is a flow diagram providing more details of the capability-based mechanism for controlling a change in instruction set, in situations where the capability check is performed before loading the capability into the program counter capability storage element, in accordance with one embodiment.

FIG. 6 is a flow diagram illustrating in more detail an embodiment where the capability check operation is performed prior to loading the identified capability into the PCC register 80. At step 250, the capability check operation is performed for the identified capability as residing in the source register. It is then determined at step 255 whether the capability check operation is passed or not. If so, the process proceeds to step 260 where the branch operation is allowed to complete in order to update the contents of the PCC register 80, and to cause the instruction set identifier field from the identified capability to then be used to indicate the instruction set. Accordingly, if the information in the instruction set identifier field differs from the information identifying the instruction set prior to performance of the branch operation, it will be appreciated that by such a mechanism the instruction set will be changed. Subsequently fetched instructions will then be decoded in accordance with the newly identified instruction set.

If the test is failed at step 255, then in one embodiment this may immediately involve the taking of an exception at step 270. However, in an alternative embodiment it may be possible to defer taking of the exception for a period of time. Accordingly, at step 265, it may be determined whether taking of the exception should be deferred or not. If not, then the exception is taken immediately at step 270.

However, if the exception is to be deferred, the process proceeds to step 275 where a flag is set to identify the failure state of the capability check operation. There are a number of ways in which the flag could be set. For example, there could be a dedicated control field within a control register that is set to identify the failure state of the capability check operation. Alternatively, some property of the program counter capability that is created using the identified capability when the branch operation is allowed to complete at step 280 can be changed so that the updated PCC will trigger the exception when any attempt is made to use it. As a particular example, the tag bit could be cleared in the updated PCC as stored within the PCC register, indicating that the PCC register does not store a valid capability.

The branch operation is allowed to complete at step 280, as a result of which the PCC contents will be updated, and the information about the instruction set will be updated using the instruction set identifier field from the identified capability. At step 285, it is determined whether the next instruction is to be executed, and if so the process proceeds to step 290 where it is determined whether the flag is set. Assuming the flag is set, then an exception is taken at step 292, and the flag is cleared. However, if the flag is not set, then the instruction is allowed to be executed at step 294.

By using the flag mechanism, this allows certain events to happen in between the time the flag is set, and the time the exception is taken. For example, it can allow a higher priority exception/interrupt to be taken that preserves the flag information and the program counter capability information, and then clears the flag and loads a different program counter capability into the program counter capability register 80. On return from that higher priority exception/interrupt, the flag and PCC information will then be restored, and when the next instruction is to be executed the presence of the set flag will cause the exception to be taken.

When the exception is taken at either step 270 or at step 292, a software exception handler will transfer control to an appropriate error handling routine to deal with the attempted change in instruction set. There are a number of steps that the error handling routine could take. However, in one embodiment, since the taking of the exception has resulted due to the fact that an attempt has been made to change instruction set using a capability that has not passed the capability check operation, it may be considered appropriate to terminate the application that caused the branch instruction to be executed. Alternatively, the exception handling routine may be arranged to perform some additional checks and/or clean up operations to make sure that it is safe to allow the instruction set to be changed by completion of the branch operation.

Figure 7:
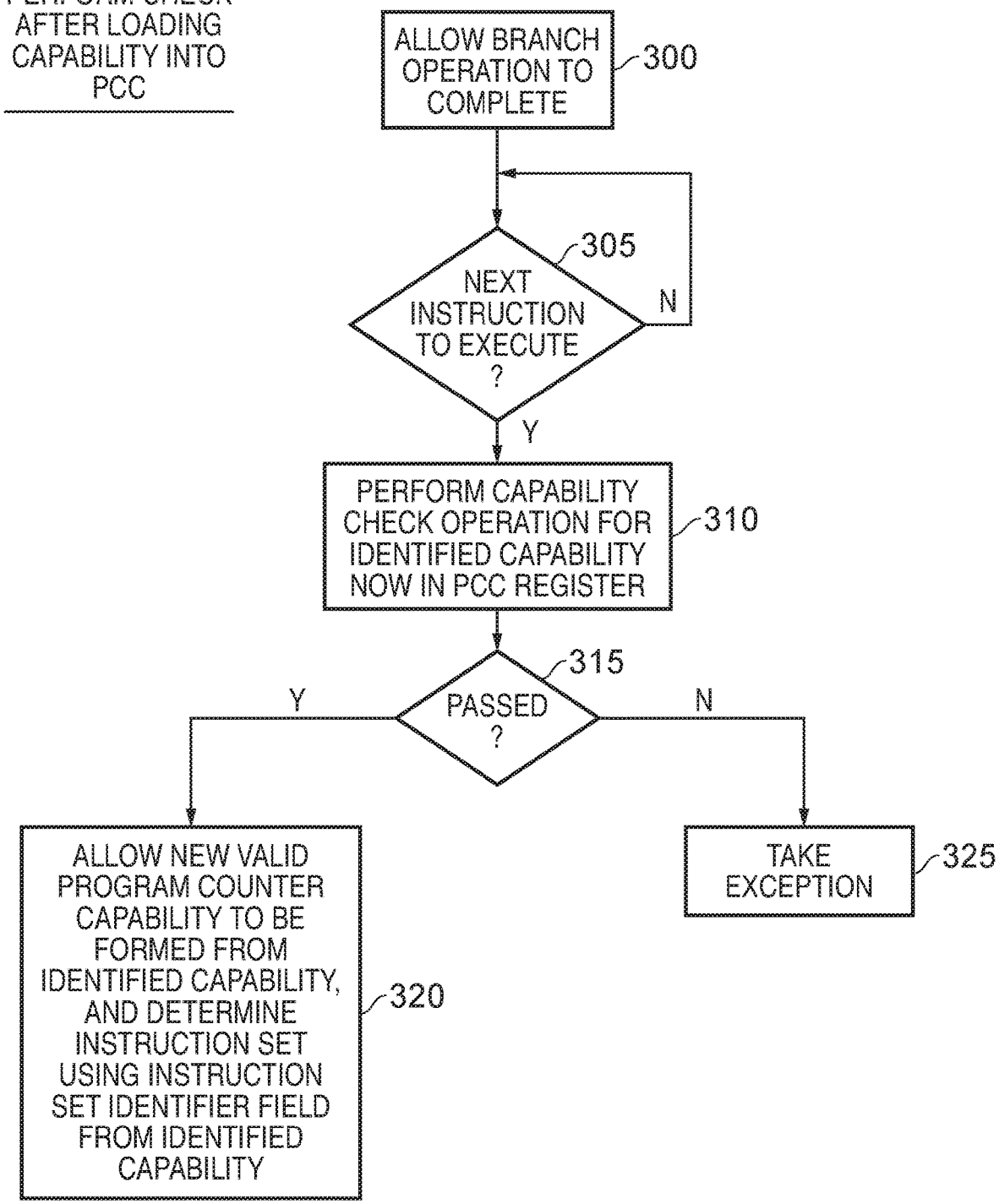
FIG. 7 is a flow diagram providing more details of the capability-based mechanism for controlling a change in instruction set, in situations where the capability check is performed after loading the capability into the program counter capability storage element, in accordance with one embodiment.

FIG. 7 is a flow diagram illustrating an alternative approach to FIG. 6, where the capability check operation is performed after loading the identified capability into the PCC register 80. Accordingly, as shown at step 300, the branch operation is allowed to complete, as a result of which the PCC register contents will be updated using the identified capability, and in addition the instruction set identifier field from the identified capability will be used to indicate the instruction set.

The process then proceeds to step 305 where it is identified whether the next instruction is to be executed, and when it is then the process proceeds to step 310 where the capability check operation is performed for the identified capability in the form in which it now resides in the PCC register. If the capability check is considered at step 315 to have been passed, then the process proceeds to step 320, where the process allows a new valid program counter capability to be formed from the identified capability, and also allows the instruction set to be determined using the instruction set identifier field from the identified capability. However, if at step 315 it is determined that the capability check operation is failed, then the process proceeds to step 325 where an exception is taken. The exception is then handled in the same way as discussed earlier for steps 270 or 292 of FIG. 6.

Figure 8:
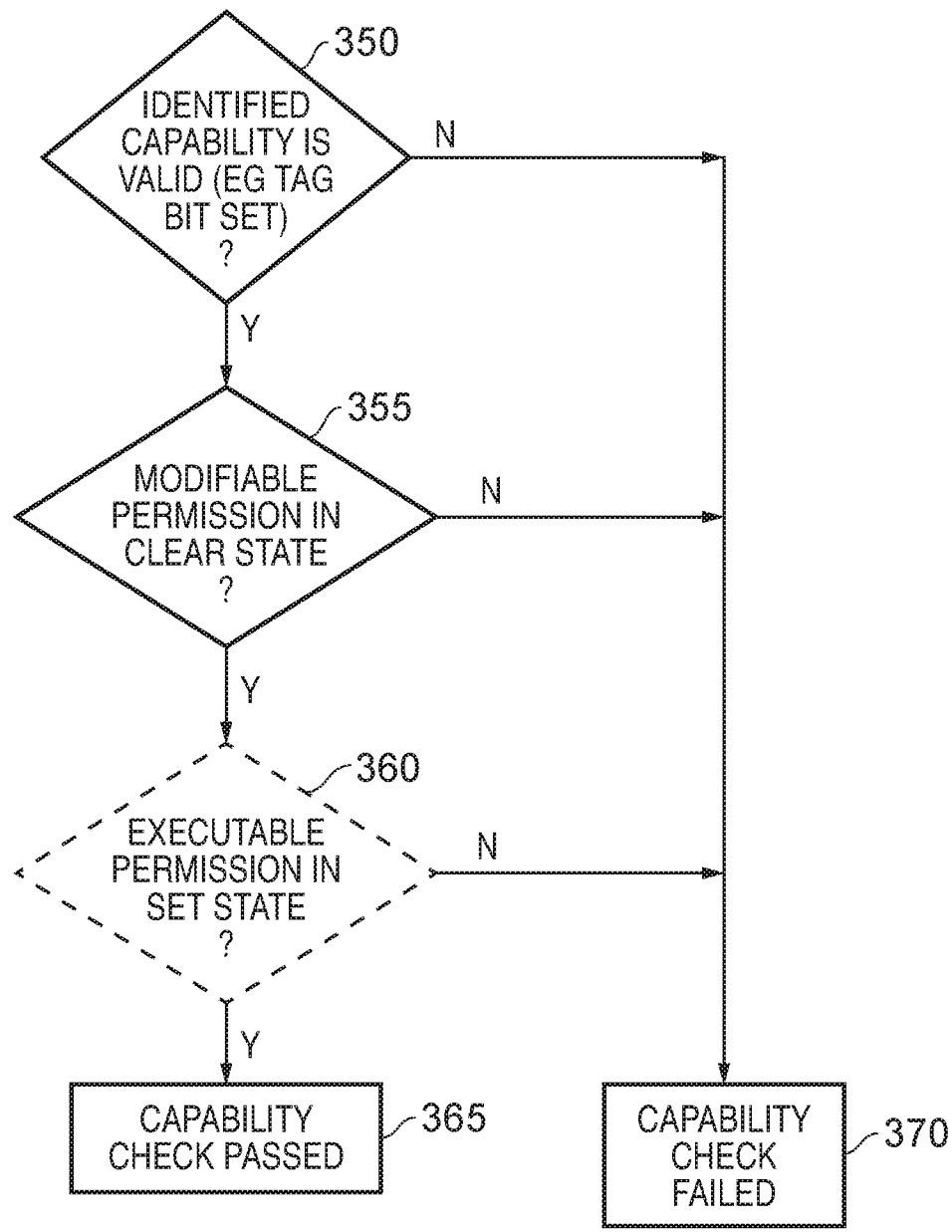
FIG. 8 is a flow diagram illustrating steps performed during the capability check operation in accordance with one embodiment.

The capability check operation can take a variety of forms, but one embodiment is illustrated by the flow diagram of FIG. 8. At step 350, it is determined whether the identified capability is valid. In one embodiment this can be determined by looking at the value of the tag bit. In particular, if the tag bit is set it is considered that the identified capability is a valid capability, whereas if the tag bit is clear it is assumed that the capability is not valid. If it is determined that the identified capability is not valid, then the process proceeds to step 370 where the capability check is indicated as having been failed.

However, assuming the identified capability is found to be valid, then in one embodiment one or more additional checks can be performed with reference to one or more permissions provided for the associated capability, the state of these permissions being determined with reference to the values of one or more permission flags held within the permission fields of the capability.

For example, in one embodiment, at step 355, it is determined whether a modifiable permission associated with the capability is in the clear state. In particular, the permission flags may be used to encode a modifiable permission, and when the modifiable permission is in the clear state, this may be used to indicate that the associated capability is unmodifiable by one or more capability modifying instructions. This can hence provide enhanced security for that particular capability, by preventing adjustment in the properties of the capability after it has been marked as being unmodifiable. For example, whilst the processing circuitry will not be able in normal operation to extend the range, or set permission flags, in relation to a bounded pointer in order to seek to increase the capability afforded to the processing circuitry by that bounded pointer, if the bounded pointer is not marked as unmodifiable, it may be possible for the processing circuitry to take steps to reduce the range and/or clear permission flags associated with the bounded pointer. However, when the capability is marked as unmodifiable, the processing circuitry will not be able to make any such adjustments.

Conversely, if the modifiable permission is in the set state, this indicates that the processing circuitry may be allowed to reduce the range and/or clear certain permission flags, provided there is no overriding control information that prevents such modification.

In one embodiment of the capability check operation, as indicated by step 355, if the modifiable permission is not in the clear state, then the capability check is determined to be failed. In particular, in this embodiment, it is determined appropriate to only allow a change in instruction set to take place as a result of loading into the PCC register an unmodifiable capability, as this provides additional reassurance that the contents of the instruction set identifier field will not have been altered since the capability was provided for use by the current process.

Accordingly, in the embodiment shown in FIG. 8 only if the modifiable permission is in the clear state, will the process be able to advance towards a situation where it determines that the capability check is passed. In one embodiment, no additional checks may be needed, and accordingly once it is determined that the modifiable permission is in the clear state, the process may proceed directly to step 365 where it is determined that the capability check is passed. However, in an alternative embodiment one or more further checks may be performed, for example considering the state of one or more other permissions encoded by the permission flags. For instance, as indicated by box 360, it may be determined whether an executable permission is in the set state. The executable permission is associated with a capability, but is only of relevance when that capability is loaded into the program counter capability register. In particular, the executable permission identifies whether that capability, when forming the program counter capability, is allowed to be used to fetch instructions from memory. Hence, if a capability within the PCC register has the executable permission in the clear state, this indicates that the capability is prevented from being used to fetch instructions from memory. This would hence indicate that the branch instruction is being used to seek to load into the PCC register 80 a capability that is not intended to be used as program counter capability. Accordingly, if the executable permission is in the clear state, the process may proceed to step 370 where the capability check is considered to have been failed.

Conversely, if the executable permission is in the set state, indicating that the capability is allowed to be used to fetch instructions from memory provided no overriding control information prevents that use, then then process may proceed to step 365 where it is determined that the capability check is passed.

Figure 9A:
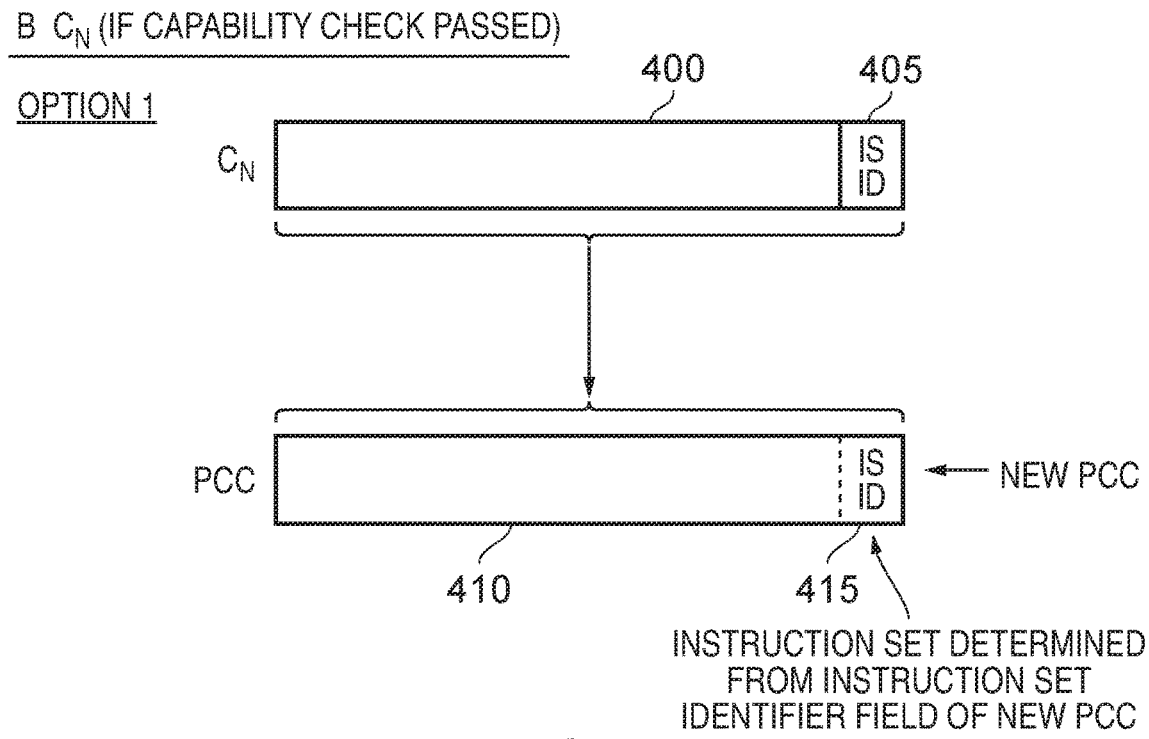
FIGS. 9A and 9B illustrate two alternative approaches for using the instruction set identifier field information when a branch instruction is executed in order to load a capability into the program counter capability storage element.
Figure 9B:
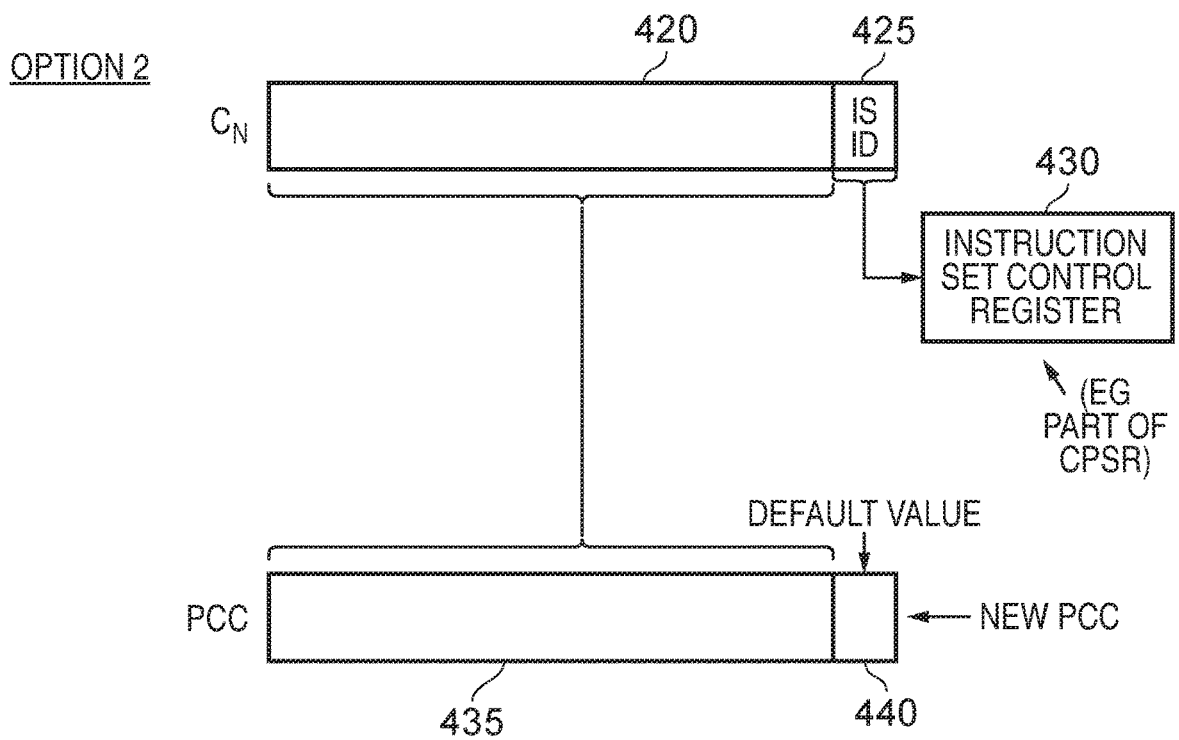

FIGS. 9A and 9B illustrate two options for use of the instruction set identifier field information when executing a branch instruction, in a situation where the capability check is determined to have been passed. As will be apparent from the earlier discussion, in situations where the capability check is determined to have been passed, then the capability within the source capability register $C_N$ is used to form a new program counter capability within the PCC register 80. As shown by option one in FIG. 9A, the identified capability 400 within the source capability register $C_N$ is hence copied into the PCC register to form the new PCC 410. In this embodiment, the instruction set identifier field 405 within the identified capability 400 is also copied into the PCC register, to form the new field 415 within the updated program counter capability 410. The processing circuitry is then arranged in this embodiment to use the value in the field 415 of the PCC register to identify the instruction set. Accordingly, if the instruction set identifier within the identified capability 405 specifies an instruction set that is different to the instruction set in use prior to the branch instruction being executed, then once the branch instruction has been executed, and accordingly the PCC register 80 contents have been updated, a change in instruction set will occur by virtue of the updated information in the field 415.

FIG. 9B illustrates an alternative embodiment where the identified capability 420 within the source capability register $C_N$ is again essentially copied into the PCC register 80 to form a new program counter capability 435. However, in this embodiment, the instruction set identifier field 425 within the identified capability 420 is extracted and stored within an instruction set control register 430 provided separately to the PCC register 80. In this embodiment, a default value is then written into the field 440 of the PCC that would otherwise correspond with the instruction set identifier field. In one embodiment, the value within the field 440 is not referred to when using the PCC 435, and hence can be set to any desired value.

In one embodiment the instruction set control register 430 may be a separate dedicated register for storing the instruction set information. However, in an alternative embodiment it can be provided by a field within an existing register, for example the current process state register(s) 74.

Figure 10:
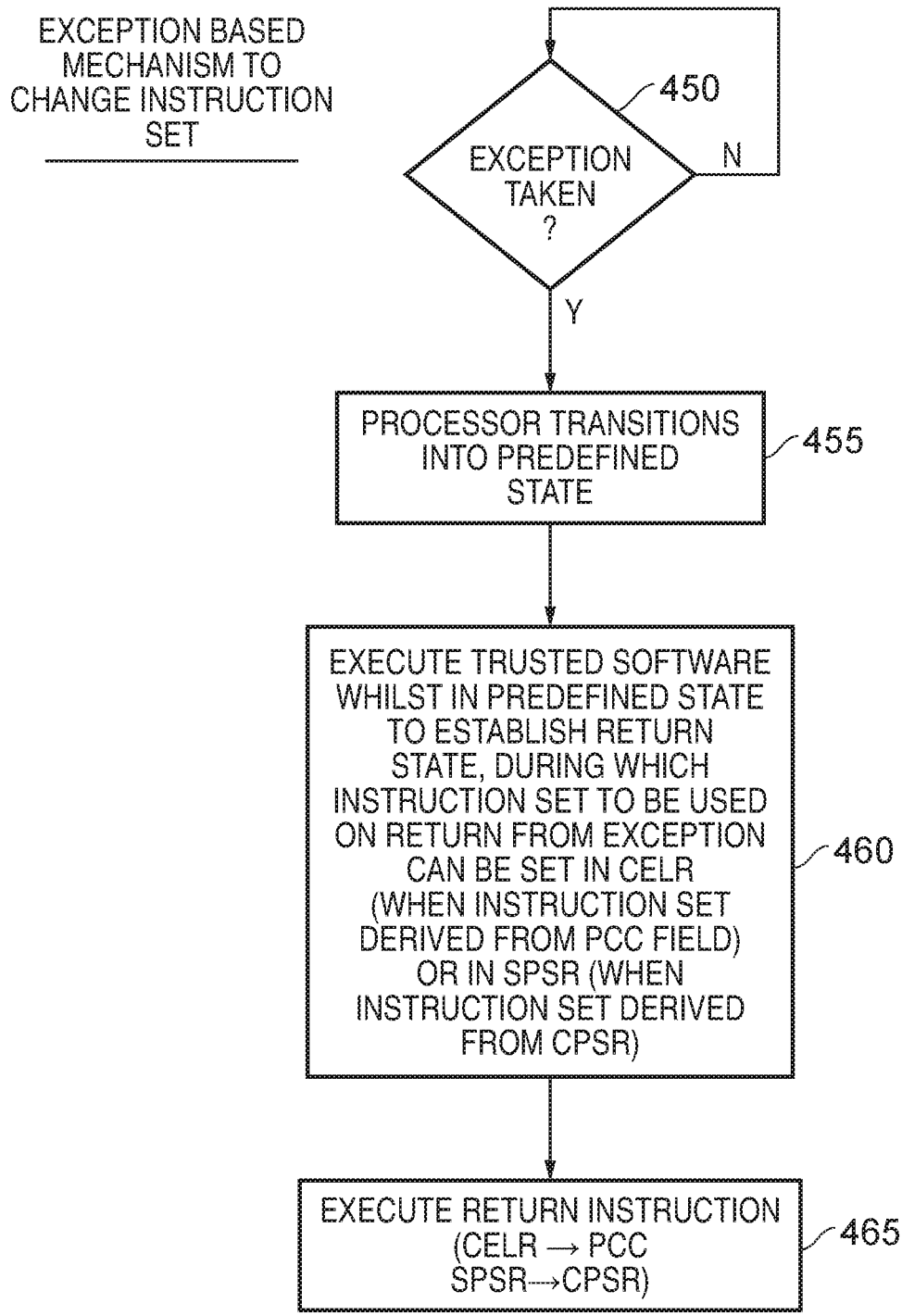
FIG. 10 is a flow diagram illustrating an exception-based mechanism that in some embodiments may also be used to allow a change in instruction set.

In one embodiment, the earlier described capability-based mechanism may be the only mechanism allowed to change instruction set. However, in another embodiment an additional, exception based, mechanism may be provided as a further mechanism to allow a change in instruction set. This process is illustrated schematically in FIG. 10. At step 450 an exception is taken, as a result of which the processor transitions into a predefined state at step 455. The exception may for example cause a transition to a higher exception level, having a higher level of software execution privilege than the process from which the exception was taken. In one embodiment, the instruction set used by the processor when handling the exception is predetermined. For example, a configuration register may be used to specify the instruction set that is applicable to exception handler code executed whilst in the predefined state. Alternatively, a field within the capability vector base address register (CVBAR) referred to earlier may be use to specify the instruction set. In one particular example, bit zero of CVBAR may be used for this purpose. As another alternative, the instruction set may be entirely fixed, so that a specific instruction set is always used for the exception handler code.

Having transitioned into the predefined state at step 455, the processor then executes trusted exception handling code in order to establish return state that will be used after returning from the exception. During this process, the instruction set to be used on return from the exception can be set in an appropriate control register. For example, when the instruction set is derived directly from a field within the PCC register, as per the example discussed earlier with reference to FIG. 9A, then the content of the CELR register 78 can be updated so that the associated field within the return address capability identifies the instruction set that should apply on return from the exception. Alternatively, if the approach of FIG. 9B is used, where the instruction set is for example given by a field within the CPSR 74, then the appropriate field within the SPSR 72 can be manipulated by the trusted software to specify the instruction set that should apply on return from the exception.

Following step 460, then a return instruction can be executed at step 465 in order to return from the exception. As part of this process, the contents of the CELR 78 will be restored into the PCC register 80, and the contents of the SPSR 72 will be restored into the CPSR 74. Thereafter, the subsequently fetched instructions will be interpreted in accordance with the newly identified instruction set.

Whilst in further embodiments it may be possible to provide one or more additional controlled mechanisms for changing instruction set, in one particular embodiment the processor may be constrained so as to only allow the instruction set to be changed by use of the capability based mechanism or the exception based mechanism described herein.

Figure 11:
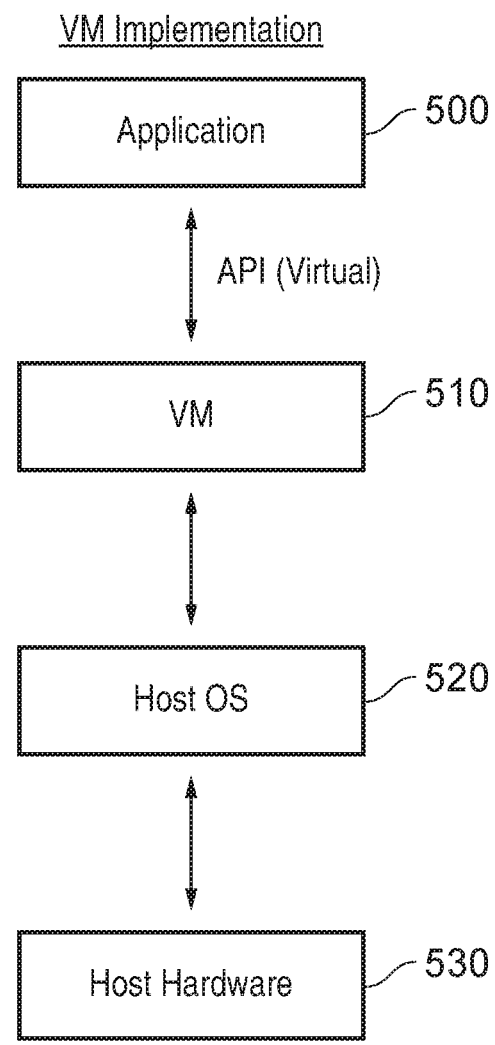
FIG. 11 illustrates a virtual machine implementation that may be used.

FIG. 11 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 may be stored on a computer-readable storage medium (which may be a non-transitory medium), and provides an application program interface (instruction execution environment) to an application program 500 which is the same as the application program interface which would be provided by the real hardware which is the device being modelled by the virtual machine program 510.

The above described techniques for controlling a change in instruction set may be implemented within a virtual machine environment. For example, software running in, or controlling, a virtual machine, could make use of hardware implementing such a feature.

From the above described embodiments, it will be seen that those embodiments provide a highly controlled and constrained technique for changing instruction set within a capability-based architecture. Through the use of such techniques, this provides protection against inadvertent or malicious attempts to change the instruction set, hence alleviating the possibility that a change in instruction set can be used in order to seek to circumvent aspects of the protection provided by the capability-based architecture.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions of an instruction set, the processing circuitry being arranged to operate in a bounded pointer domain comprising bounded pointers used to constrain operations performed by the processing circuitry when executing said instructions, wherein each bounded pointer includes a pointer value and range information specifying an allowable range of addresses when using the bounded pointer; and
program counter bounded pointer storage to store a program counter bounded pointer used by the processing circuitry to determine a program counter value;
the processing circuitry being arranged to employ a bounded pointer based operation to change the instruction set, in response to execution of at least one type of instruction that is used to load an identified bounded pointer into the program counter bounded pointer storage, the processing circuitry being arranged to invoke the bounded pointer based operation in order to perform a capability bounded pointer check operation in respect of the identified bounded pointer and to cause the instruction set to be identified by an instruction set identifier field from the identified bounded pointer provided the bounded pointer check operation is passed.

2. An apparatus as claimed in claim 1, wherein the processing circuitry is arranged to perform the bounded pointer check operation on the identified bounded pointer prior to loading that identified bounded pointer into the program counter bounded pointer storage.

3. An apparatus as claimed in claim 1, wherein the processing circuitry is arranged to perform the bounded pointer check operation on the identified bounded pointer after loading that identified bounded pointer into the program counter bounded pointer storage.

4. An apparatus as claimed in claim 1, wherein the processing circuitry is arranged to take an exception in response to detecting failure of the bounded pointer check operation.

5. An apparatus as claimed in claim 4, wherein the processing circuitry is arranged to set a flag to identify failure of the bounded pointer check operation, setting of the flag causing the exception to be taken when a next instruction is to be executed.

6. An apparatus as claimed in claim 1, wherein:
the processing circuitry is arranged to invoke the bounded pointer based operation by executing a branch instruction specifying the identified bounded pointer.

7. An apparatus as claimed in claim 6, further comprising:
one or more bounded pointer storage elements accessible to the processing circuitry and arranged to store bounded pointers used to constrain operations performed by the processing circuitry when executing said instructions;
wherein the branch instruction specifies one of said one or more bounded pointer storage elements as a source operand, the specified capability bounded pointer storage containing said identified bounded pointer.

8. An apparatus as claimed in claim 6, wherein:
said branch instruction comprises a return instruction which is executed in order to load into the program counter bounded pointer storage a return address bounded pointer forming said identified bounded pointer.

9. An apparatus as claimed in claim 1, wherein:
the processing circuitry is arranged, when performing said bounded pointer check operation, to check a valid flag associated with the identified bounded pointer in order to prevent the bounded pointer check operation being passed unless the identified bounded pointer is a valid bounded pointer.

10. An apparatus as claimed in claim 1, wherein:
the identified bounded pointer comprises one of more permission flags used to identify the state of one or more permissions associated with the identified bounded pointer; and
the processing circuitry is arranged, when performing said bounded pointer check operation, to check the one or more permission flags in order to prevent the bounded pointer check operation being passed unless at least one permission is in a predetermined state.

11. An apparatus as claimed in claim 10, wherein said at least one permission comprises an executable permission used to identify whether the identified bounded pointer, when used as the program counter bounded pointer, is allowed to be used to fetch instructions from memory, and the predetermined state is a set state indicating that the identified bounded pointer is allowed to be used to fetch instructions from memory, subject to any overriding control information preventing use of the identified bounded pointer to fetch instructions from memory.

12. An apparatus as claimed in claim 10, wherein said at least one permission comprises a modifiable permission used to identify whether the identified bounded pointer is modifiable by one or more bounded pointer modifying instructions, and the predetermined state is a clear state indicating that the bounded pointer is unmodifiable by said one or more bounded pointer modifying instructions.

13. An apparatus as claimed in claim 1, wherein:
when the bounded pointer check operation is passed, the processing circuitry is arranged to cause the identified bounded pointer, including the instruction set identifier field, to be used to form a new program counter bounded pointer within the program counter bounded pointer storage; and
the value of the instruction set identifier field within the new program counter bounded pointer is used to determine the instruction set.

14. An apparatus as claimed in claim 1, wherein:
when the bounded pointer check operation is passed, the processing circuitry is arranged to cause the identified bounded pointer to be used to form a new program counter bounded pointer within the program counter bounded pointer storage but with a field in the new program counter bounded pointer corresponding to the instruction set identifier field being set to a default value, the processing circuitry further causing the value within the instruction set identifier field of the identified bounded pointer to be written into instruction set control storage; and
the value within the instruction set control storage is used to determine the instruction set.

15. An apparatus as claimed in claim 14, wherein the instruction set control storage is provided by a field within a current processor state register (CPSR).

16. An apparatus as claimed in claim 1, wherein the processing circuitry further provides an exception based operation to change the instruction set, on invoking the exception based operation the processing circuitry being arranged to take an exception into a predefined state, where trusted software is then executed to establish return state that identifies the instruction set to be used on return from the exception.

17. An apparatus as claimed in claim 16, wherein the processing circuitry is constrained so as to only allow the instruction set to be changed by using either the bounded pointer based operation or the exception based operation.

18. A method of controlling a change in instruction set within an apparatus having processing circuitry to execute instructions of a current instruction set, the processing circuitry being arranged to operate in a bounded pointer domain comprising bounded pointers used to constrain operations performed by the processing circuitry when executing said instructions, wherein each bounded pointer includes a pointer value and range information specifying an allowable range of addresses when using the bounded pointer, the method comprising:
storing, within program counter bounded pointer storage, a program counter bounded pointer used by the processing circuitry to determine a program counter value;
arranging the processing circuitry to be responsive to execution of at least one type of instruction that is used to load an identified bounded pointer into the program counter bounded pointer storage, to invoke a bounded pointer based operation to control change of the current instruction set, said bounded pointer based operation comprising:
performing a bounded pointer check operation in respect of the identified bounded pointer; and
causing the instruction set to be identified by an instruction set identifier field from the identified bounded pointer provided the bounded pointer check operation is passed.

19. An apparatus comprising:
processing means for executing instructions of an instruction set, the processing means for operating in a bounded pointer domain comprising bounded pointers used to constrain operations performed by the processing means when executing said instructions, wherein each bounded pointer includes a pointer value and range information specifying an allowable range of addresses when using the bounded pointer; and
means for storing a program counter bounded pointer used by the processing means to determine a program counter value;
the processing means employing a bounded pointer based operation to change the instruction set, in response to execution of at least one type of instruction that is used to load an identified bounded pointer into the program counter bounded pointer storage element, the processing means for invoking the bounded pointer based operation in order to perform a bounded pointer check operation in respect of the identified bounded pointer and to cause the instruction set to be identified by an instruction set identifier field from the identified bounded pointer provided the bounded pointer check operation is passed.

20. A non-transitory computer-readable storage medium storing a virtual machine computer program comprising program instructions to control a host data processing apparatus to provide an instruction execution environment corresponding to an apparatus, the apparatus comprising:
processing circuitry to execute instructions of an instruction set, the processing circuitry being arranged to operate in a bounded pointer domain comprising bounded pointers used to constrain operations performed by the processing circuitry when executing said instructions, wherein each bounded pointer includes a pointer value and range information specifying an allowable range of addresses when using the bounded pointer; and
program counter bounded pointer storage to store a program counter bounded pointer used by the processing circuitry to determine a program counter value;
the processing circuitry being arranged to employ a bounded pointer based operation to change the instruction set, in response to execution of at least one type of instruction that is used to load an identified bounded pointer into the program counter bounded pointer storage, the processing circuitry being arranged to invoke the bounded pointer based operation in order to perform a bounded pointer check operation in respect of the identified bounded pointer and to cause the instruction set to be identified by an instruction set identifier field from the identified bounded pointer provided the bounded pointer check operation is passed.

* * * * *